Aug. 17, 1965

B. J. GALLAGHER 3,200,839

SAFETY RELIEF VALVE

Filed Aug. 17, 1962

INVENTOR.
BERNARD J. GALLAGHER
BY
*Fay & Fay*
ATTORNEYS

United States Patent Office 3,200,839
Patented Aug. 17, 1965

3,200,839
SAFETY RELIEF VALVE
Bernard J. Gallagher, Cleveland Heights, Ohio, assignor to Nuclear Products Company, Cleveland, Ohio, a corporation of Ohio
Filed Aug. 17, 1962, Ser. No. 217,582
4 Claims. (Cl. 137—516.29)

This invention relates to valves in general and more particularly is directed to a novel valve assembly which will perform as a safety or relief valve.

More specifically, the instant invention contemplates a single valve which will perform the function of a safety valve as well as that of a relief valve.

Safety valves are classified as such because of their inherent ability to move to full open on a pressure surge. It will become apparent that the embodiment disclosed will perform in this manner due to its novel construction.

The term relief valve has been used in the art to designate a valve construction which has stem travel characteristics which are generally proportional to the amount of pressure over the set pressure. A simple example of this type would include a valve with its stem disk of constant diameter resting in a frustro-conical seat. On opening, an increase in flow area is had; however, the force exerted on the stem is constant since the area exposed to the pressure remains constant in the open and closed positions.

Safety valves are constructed so that on opening, regardless how slight, the effective area on the stem seat is increased with the resulting increase in force which moves the stem seat to a full flow position.

A wide variety of safety and relief valves are available on the market today; however, at best it is difficult to find a single valve which will embody all the requirements necessary to meet modern design demands. The critical requirements of designers in the instrumentation fluid handling and related fields envision a safety relief valve which is small in size, capable of being accurately set to open at critical pressures and will be leak tight after reseating. Further, the range of opening pressures in a single valve must be of a wide scope to insure versatility of the system.

Of no less importance is the requirement that the valve operate free of stem chatter. If the overall size of the valve assembly is of little or no consequence, this demand can be met with ease. However, as noted above, good design dictates that the valve assembly will be as small as possible, generally because of space limitations. In fulfilling this requirement, stem chatter becomes a problem, the solution of which has been effected in the instant embodiment, as will hereinafter become apparent.

A further feature of importance to designers is the availability of a valve having a manual control to facilitate flushing or purging of unwanted gases or liquids from the system whenever such is necessary or desirable. Prior art devices have failed to meet the demanding design requirements for one reason or another. The requirements heretofore noted have been fulfilled by the instant invention, which also provides additional advantages over prior art devices.

It is therefore an object of this invention to provide a novel safety relief valve.

It is a further object of this invention to provide a valve assembly which will perform the functions of a safety valve as well as a relief valve.

It is a further object of this invention to provide a safety relief valve which will be accurate, when once set, to open at a predetermined pressure.

It is a further object of this invention to provide a value which is easily and quickly adjustable over a wide range of opening pressures.

It is a further object of this invention to provide a means to eliminate stem chatter while insuring smooth travel of the valve stem.

It is a further object of this invention to provide a limit means to control deformation of the O-ring seat seal.

It is a still further object of this invention to provide a valve which will reseat under the set spring so as to insure against further flow.

It is a still further object of this invention to provide a pressure responsive valve which may be manually operated.

It is a still further object of this invention to provide a valve which may be miniaturized due to the novel interrelationship of the component parts.

Further and fuller objects will become readily apparent when reference is made to the accompanying drawing, wherein like reference characters refer to like parts.

Figure 1:
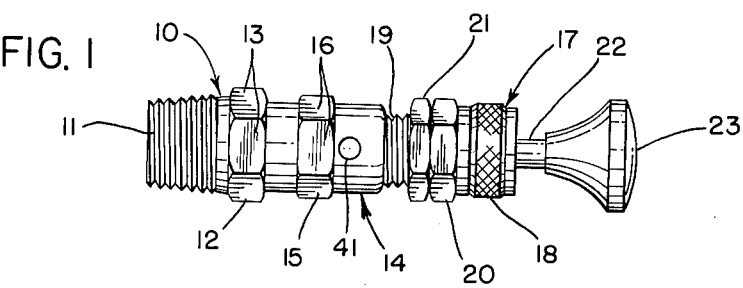
FIG. 1 is an elevational view of the novel relief valve.

Referring now to FIG. 1, therein is shown in elevation an embodiment of the instant invention. A body portion 10 is provided with male threads 11 for facilitating connection to the tank or fluid handling system utilizing the valve. It is obvious that any suitable connecting means may be employed in lieu of the male threads 11, the particular type being dictated by the environmental use. A polygonal portion 12 is provided with tool pads 13 to accommodate suitable tool means for joining to the system. A bonnet 14 is also provided with a polygonal portion 15 having tool pads 16 for use in assembling to the body portion 10. A bonnet nut 17 is provided with knurled portion 18 to provide a good gripping means for adjusting the spring compression. The knurled portion 18 further assists in assembling the bonnet nut 17 to the threaded portion 19 of the bonnet 14. A polygonal portion 20 is at the terminus of the bonnet nut and, as shown in FIG. 1, is adjacent a lock nut 21, which is also threadably received on the bonnet. The spring compression is set by rotating the bonnet nut 17 as will hereinafter be explained in greater detail. The setting will be maintained and not accidentally changed if the lock nut 21 is forced back against the bonnet nut. A stem 22 extends through the bonnet nut in slidable relationship therewith, terminating in thread means to receive a knob 23 which provides suitable gripping means so that the valve may be manually controlled.

Figure 2:
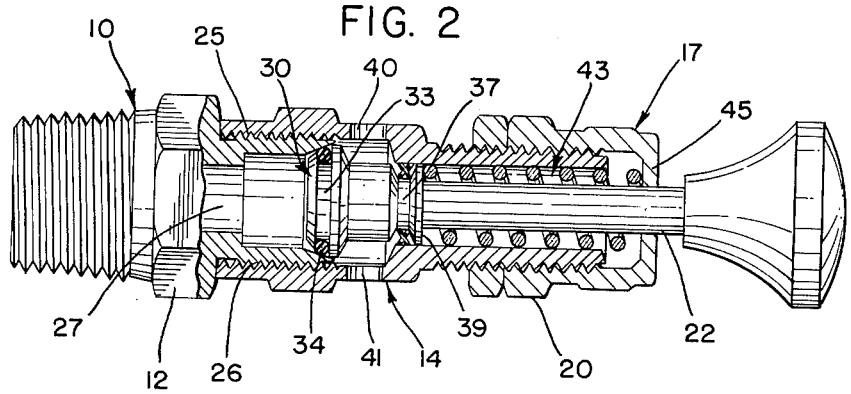
FIG. 2 is an enlarged view, with parts of the body, sealing member and spring in section, illustrating the valve in a closed position.

Referring now to FIG. 2, the body portion 10 is provided with male threads 25 interfitting with female threads 26 on the bonnet. The body portion has an aperture 27 extending therethrough. The aperture has a counterbored portion 28 which terminates in an outwardly flaring frusto-conical seat 29. Interfitting with the seat 29 is a valve disk 30. The valve disk 30 is integral with the stem portion 22 and is of a generally frusto-conical configuration, as seen in FIG. 2, with the front terminus 31 merging into a light chamfer by a smooth curve and then to a flat face, as will be hereinafter described more fully. The disk 30 is provided with a groove 33 to receive suitable seal means, such as an O-ring 34. Rearwardly of the disk 30 is an angulated shoulder 35, which merges into cylindrical portion 36. The cylindrical portion 36 is provided with a groove 37 which receives a suitable seal means such as the cruciform or quad ring 38 illustrated. The quad ring 38 provides a good support to guide the stem in its axial travel, as well as preventing foreign material from entering the chamber 43, which would impair the precise and smooth operation of the valve. The quad ring 38 provides minimum frictional resistance to the stem travel. It is obvious that the opening or set pressure would be impaired if the stem seal imposed heavy frictional loads resisting stem movement. The ring is therefore under a light squeeze when installed in the assembly to minimize frictional resistance. In the embodiment shown, the overall frictional resistance to movement is of such a low order that it cannot be detected over the normal operating range of the valve. A further advantage achieved by use of the quad ring 38, is its ability to damp vibrations normally encountered in pressure relief application, especially pressure surges. In prototype models, the vibrations under these conditions were so severe that the valve life would be less than an hour of actual relieving service. The instant embodiment has a useful life greatly in excess of the prototypes mentioned above. The cylindrical portion 36 terminates in a shoulder 39, which extends generally radially from the stem 22.

The bonnet 14 is provided with fluid ports 40 and 41, which, for ease of manufacture, are placed radially opposite each other. It is to be understood, however, that the ports could be placed at angles to each other, and any feasible number could be employed.

The bonnet nut 17 has a cylindrical opening 42 which is of slightly greater diameter than the stem 22 to allow the latter to be guided in its axial travel. The bonnet nut 17 forms, with the inwardly extending radial shoulder 39, a spring chamber 43. Concentrically disposed about the stem 22 within the chamber 43 is a spring 44 with one end bottomed on the radially inwardly extending shoulder 45 of the bonnet nut, and the other end abutting the radially extending shoulder 39 of the movable stem assembly. Suitable washers may be provided at the ends of the spring to minimize the torque required to adjust the bonnet nut. It can be seen that the spring resists outward axial movement of the valve stem and serves normally to bias the disk 30 into the seat 29.

Further shortening of the overall length can be achieved by removing the knob 23 in the event manual control is not desired. It is contemplated that the knob 23 be composed of a phenolic plastic with a tapped brass insert; however, any suitable gripping means will suffice. In most instances the knob would be of bright red coloring so that it would be easily discernible from other controls.

Upon inspection of the illustrated embodiments it is readily apparent to those skilled in the art that the compression of the spring 44 may be set and/or adjusted with ease. For example, if additional biasing force is desired to increase the opening pressure of the valve, the lock nut 21 is backed off from the bonnet nut 17. The latter can then be advanced the necessary number of turns to obtain the desired increase in spring compression. The lock nut 21 is subsequently jammed against the bonnet nut to prevent the latter from working loose.

In one concrete embodiment where the adjustable pressure range was from 10 to 50 p.s.i., an increase of 8 p.s.i. was the approximate change in opening pressure per turn of the bonnet nut. Good response was obtained when the valve was subjected to surge and slight over pressures. The cruciform or quad ring 37 sliding in the spring chamber 43 provides a dynamic guide means for the valve so that the travel is smooth and linear, while serving the additional function of preventing the ingress of dirt, foreign matter and corrosive substance into the spring chamber. The smooth travel is materially assisted by the small clearances between the smoothly finished, relatively movable parts.

Figure 4:
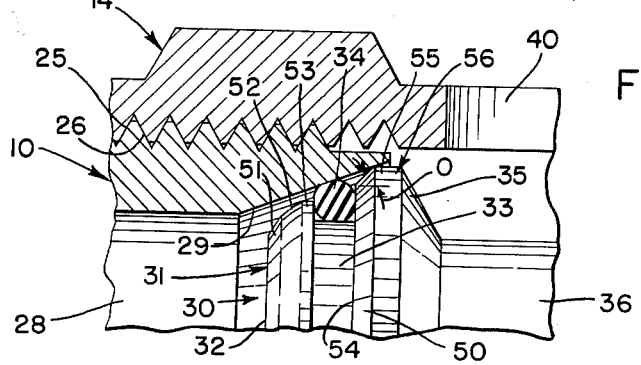
FIG. 4 is an enlarged fragmentary view of the seating assembly with parts in section to illustrate the details of the valve disk.

As heretofore pointed out, one of the problems encountered in prior art devices is the sticking of the valve disk in the valve seat, thereby making it virtually impossible to foretell the opening pressure. Obviously, the valve cannot be accurately set under these conditions. The problem of sticking has been obviated by the novel construction of the disk 30 and the co-operating seat. As is best seen in FIG. 4, in the closed position the axial travel of the valve disk 30 is limited by chamfered portion 50 engaging the mouth 29 along a line adjacent the end thereof for reasons to be explained hereinafter. The O-ring 34 is the first to come into contact with the mouth 29 as the valve closes due to the reduced diameter of terminus 31. The inherent resilience of the O-ring enables it to become deformed a predetermined amount under the axial force exerted by the spring, thereby allowing the chamfered portion 50 on the rear terminus 56 to engage the mouth 29 on a line contact. This construction serves to limit the compression exerted on the O-ring 34, which is exceedingly important if sticking is to be avoided. The amount of compression on the O-ring is the same at lower pressures of the order of 10 p.s.i. to high pressures of the order of about 200 p.s.i. It has been found that sticking occurs where high loads are imposed on an elastomer which is in contact with a material such as brass. Under such conditions the elastomer tends to adhere to the metal surface with the undesirable effect of increasing the force necessary to open the valve. Since the chamfer portion 50 engages the mouth limiting the axial travel of the disk 30, the load imposed on the elastomer is kept to a minimum.

The O-ring 34 in the free state is about ten to twenty percent greater in cross sectional diameter than the width of the groove 33 so that the O-ring will seal on the sides of the groove. This precludes fluid entry into the region of the inner periphery of the ring at the bottom of the groove 33 which could cause extrusion of the ring when the valve is opened.

The mouth portion is formed on an included angle of from about 30° to about 58°, the preferred included angle being about 40° magnitude with a tolerance of + or − of .25°. The selection of a desired included angle is dependent on the environmental conditions encountered since the angle could be increased to the maximum if a greater flow at cracking were desired. However, excellent results have been obtained with the embodiment illustrated wherein the included angle is approximately 35°. The chamfer portion 50 is formed on an included angle of about 45° with a tolerance of + or −, .50°. The chamfer 50 with the cylindrical portion 55 forms the rear terminus 56 of the disk 30. If the angle of the mouth is increased, the included angle of the chamfered portion represented by the symbol $\theta$ is increased a corresponding amount, always remaining of the order of about 10° more than the angle of the mouth. This insures good seating since the diameter of the disk 30 cannot touch the seat 29. The chamfered portion 50 always engages the seat 29 on a line contact with the mouth portion, thereby reducing any possibility of sticking.

The disk 30 has a face portion 32 which has a slight chamfer 51 at the periphery. The chamfer 51 merges into an arcuate portion 52 of a slight radius, which, in turn, arcuately merges with the side 53 of the O-ring groove 33.

The rear wall 54 of the groove must be equal to or greater than the radius of the cross-sectional axis of the ring to insure good seating and prevent extrusion of the ring from the groove 33 under pressure. The arcuate portion 52 of the forward terminus gives rise to excellent flow characteristics at slight cracking as well as the full open. The difference in diameter of the forward and rear terminus is further important if the valve is to perform as a safety relief valve. A more complete description of this function will be given hereinafter when the operation of the valve is discussed.

It has been found that the surface finish of the seat 29 plays an important part in enhancing the flow characteristics of the assembly and, more importantly, minimizing the frictional resistance to unseating while enhancing the sealing characteristics of the co-operating parts. A controlled surface finish of from 4 to about 32 microinches has been found to be very satisfactory for the seat 29. This precludes sticking of the valve disk in the valve seat, thereby insuring opening at the proper predetermined pressure. The finished surfaces materially reduce the resistance to flow created by the friction on the surfaces.

Figure 3:
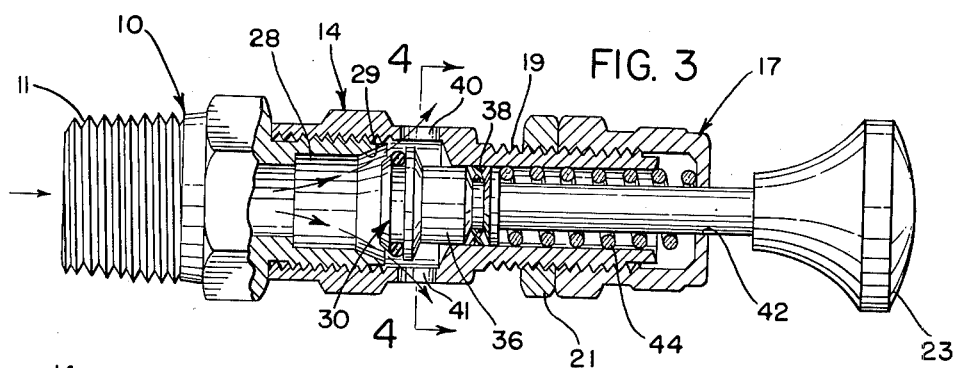
FIG. 3 is a view similar to FIG. 2 with the valve in an open position.

The operation of the novel safety relief valve will be described with reference to FIG. 3. Assuming for purposes of description that the valve is used for relief of a pressurized tank or like system, and assuming further that the pressure buildup has exceeded the predetermined minimum by a slight amount, the force generated by the pressure acting on the area on the diameter at the point of sealing causes the disk 30 and its associated stem to move slightly to the right, as is illustrated in FIG. 3. In so doing, the seal 34 at the seat is broken and the excess pressure is allowed to escape as represented by the arrows. When the force generated by the pressure acting on the area of the rear terminus 56 is less than the compressive force of the spring as set, the valve automatically reseats fluid tightly. The overall linear travel of the stem and disk 30 is small, often referred to in the art as merely "cracking" the valve. The "cracking" and closing of the valve in relief of slight overpressures is almost instantaneous because of the slight differential between the actual pressure and that set.

The valve disclosed can also operate as a full opening safety valve. Assuming that a pressure surge is felt by a system employing the instant device, such pressure acting on the surface area represented by the sealing diameter, serves to move the disk 30 out of the seat 29. As soon as the valve opens a slight amount a greater area is exposed for the pressure to work on, thereby resulting in increased force acting against the spring. The increase in area, on opening, results from the rear terminus 56 being of a greater diameter than the forward terminus 52 and the diameter at the point of sealing. The rear terminus is maximized with respect to the overall body diameter and mouth diameter by having the terminus 56 of such a diameter so as to seat a slight axial distance inward from the terminal point of the mouth. Since force is a function of pressure times area, the increase in area with constant pressure results in greater force, which serves to move the disk 30 to full open, insuring instantaneous bleeding of undesirable surge pressures which could be injurious to the system. It can be appreciated that the disk 30 will be moved to full open at less overpressure than would be the case if a larger terminus 56 were not present.

The present invention may be used as an automatic pressure relieving device, actuated by the static pressure acting on the area defined by the sealing diameter 61, as heretofore described. It may be used for gas or vapor, as well as liquid. As a relief valve, the instant embodiment operates in the same fashion as a safety valve, as noted above. However, in a relief situation, it is used primarily for liquid service.

The embodiment heretofore described is accurate in that it seats properly within the seat provided due to the fine surface finish. Moreover, the surface finish and overall construction provide for leak-tight reseating after opening. The movable bonnet and locking means therefore provide a wide range of adjustment for opening pressures. The guiding quad ring 38 eliminates and damps stem chatter during automatic or manual operation.

When the pressure reaches the predetermined minimum cracking point, the valve opens instantaneously to relieve excessive pressure and then reseats quickly when the pressure reaches a safe level. The seating arrangement in the safety valve herein disclosed provides an increasingly larger flow area as the stem moves back. After cracking, the stem retracts quickly because the line pressure is then acting on the projecting area at the extreme diameter of the stem. In other words, the area is increased for the pressure to work on, thereby resulting in increased force. This allows the valve to open almost instantaneously to full flow on a given pressure surge. Usually, the volume of fluid to be relieved is very small on slow pressure buildups. Under these conditions, the valve will crack slightly, relieve the pressure, and reseat very close to the original cracking pressure. The close fit of the parts insures smooth linear travel with minimal friction. The surface finish of seat 29 provides for good flow therethorough, as well as leak tight seating.

Although a single preferred embodiment has been illustrated, such has been done only in the interest of illustrating and describing the invention. It is not intended that this be limiting inasmuch as this is necessary for accurate description of the principles involved. It is intended, however, that the scope of the invention be limited by the scope of the appended claims.

I claim:

1. A pressure relief valve comprising an apertured body portion having a frusto-conical seat therein;
   bonnet means threadably received on said body portion;
   said bonnet means having wall means defining a cylindrical chamber therein having a first portion with a first diameter adjacent said seat and a second portion with a second diameter smaller than said first diameter remote from said seat;
   port means communicating with said chamber;
   an aperture in said bonnet coaxial with said first and second portions;
   a slidably movable valve stem extending into said second portion through said aperture;
   said stem having seal means thereon remote from said aperture and in guided engagement with said second portion;
   a valve disk rigidly carried by said stem and being adapted to cooperate with said frusto-conical seat means;
   said valve disk having groove means therein;
   sealing means in said groove means adapted to cooperate with said seat thereby to prevent flow through said body portion;
   said groove means being defined by forward and rear terminus portions;
   said forward terminus being of lesser diameter than said rear terminus but of a greater diameter than said second portion;
   said rear terminus having a chamfered portion thereon adapted to engage said frusto-conical seat when said valve is closed;
   the included angle of the chamfer on said rear terminus being greater than the included angle of the frusto-conical seat;
   spring means in said chamber normally urging said valve disk into engagement with said seat; and
   means for facilitating adjustment of said spring means to set said valve for relief over a wide range of pressures.

2. The relief valve of claim 1 wherein the seal means on said stem is a ring of cruciform shape.

3. The relief valve of claim 1 and further including manual control means on said valve stem thereby permitting manual opening and closing of said valve.

4. The valve of claim 1 wherein said frusto-conical seat has the surface finish in the range of 4–32 microinches to obviate sticking.

References Cited by the Examiner

UNITED STATES PATENTS

| | | | |
|---|---|---|---|
| 2,162,898 | 6/39 | Rotter | 137—469 XR |
| 2,820,474 | 1/58 | Greenwood | 137—536 |
| 2,875,978 | 3/59 | Kmiecik | 251—333 |
| 2,929,401 | 3/60 | Cowan | 251—357 XR |
| 2,981,282 | 4/61 | Mack | 137—516.29 |
| 3,053,501 | 9/62 | Varga | 137—516.29 X |
| 3,054,422 | 9/62 | Napolitano | 137—516.27 X |

FOREIGN PATENTS

| | | |
|---|---|---|
| 1,125,604 | 7/56 | France. |
| 1,210,452 | 9/59 | France. |

WILLIAM F. O'DEA, *Primary Examiner.*